United States Patent [19]

Fuller et al.

[11] 4,079,123

[45] Mar. 14, 1978

[54] PROCESS FOR THE PRODUCTION OF CHLORINE DIOXIDE

[75] Inventors: Willard A. Fuller, Grand Island; Earl A. Schilt, Kenmore, both of N.Y.

[73] Assignee: Hooker Chemicals & Plastics Corporation, Niagara Falls, N.Y.

[21] Appl. No.: 755,925

[22] Filed: Dec. 30, 1976

[51] Int. Cl.² ............... C01B 11/02; C01B 7/03; C01D 5/02; C01B 7/02
[52] U.S. Cl. ............... 423/478; 423/313; 423/499; 423/500; 423/552
[58] Field of Search ............ 423/478, 505, 500, 551, 423/552, 499, 313

[56] References Cited

U.S. PATENT DOCUMENTS

| | | | |
|---|---|---|---|
| 3,563,702 | 2/1971 | Partridge et al. | 423/478 |
| 3,816,077 | 6/1974 | Fuller et al. | 423/478 X |
| 3,864,456 | 2/1975 | Winfield et al. | 423/478 |
| 3,933,987 | 1/1976 | Schulz et al. | 423/478 |
| 3,974,266 | 8/1976 | Fuller | 423/478 |
| 3,976,430 | 8/1976 | Houston et al. | 23/273 R |

FOREIGN PATENT DOCUMENTS 932,215 7/1963 United Kingdom .................. 423/395

*Primary Examiner*—Edward Stern

*Attorney, Agent, or Firm*—Peter F. Casella; Howard M. Ellis; Thomas T. Gordon

[57] ABSTRACT

An improved process is provided for the production of chlorine dioxide and chlorine wherein an alkali metal chlorate and a strong acid selected from the group sulfuric acid, hydrochloric acid, phosphoric acid, and mixtures thereof are circulated and reacted in an integral forced circulation crystallizing reaction evaporator comprising in vertical disposition:

a. an upper crystallizing evaporation chamber having a substantially vertically disposed cylindrical partition which divides at least the lower portion of the reaction evaporation chamber into a first and second substantially concentric cylindrical sections;

b. a heat exchange chamber, and c. a lower pump chamber, having a pump means disposed therein to provide forced circulation of fluids within the reaction evaporator.

An aqueous slurry of alkali metal salt of the strong acid is withdrawn from the lower portion of the pump chamber and chlorine dioxide, chlorine, and water vapor are withdrawn from the evaporation chamber.

10 Claims, 1 Drawing Figure

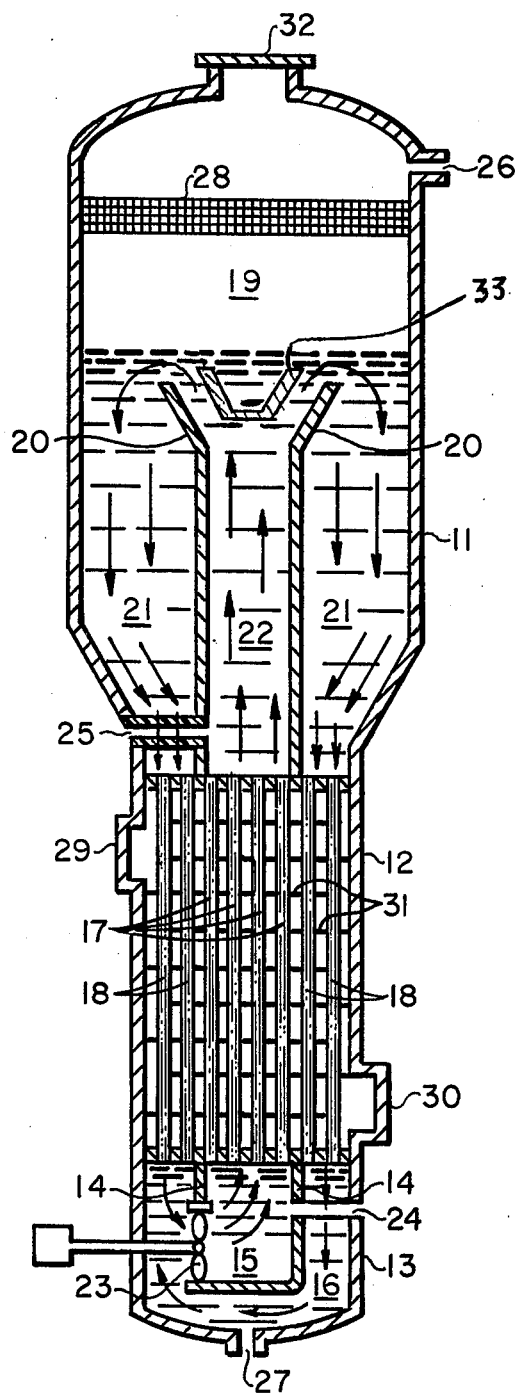

PROCESS FOR THE PRODUCTION OF CHLORINE DIOXIDE

BACKGROUND OF THE INVENTION

The present invention relates to a new, economical, very efficient process for generating chlorine dioxide.

Inasmuch as chlorine dioxide is of considerable commercial importance in the fields of pulp bleaching, water purification, fat bleaching, removal of phenols from industrial wastes, textile bleaching, and the like, it is very desirable to have a process by which it can be economically generated.

One means for the generation of chlorine dioxide is by way of reaction of a chlorate, a chloride, and sulfuric acid. The reactions which occur are exemplified below, wherein, for the sake of illustration, the chlorate used is sodium chlorate and the chloride used in sodium chloride (1) $NaClO_3 + NaCl + H_2SO_4 \rightarrow ClO_2 + \frac{1}{2} Cl_2 + Na_2SO_4 + H_2O$ (2) $NaClO_3 + 5NaCl + 3H_2SO_4 \rightarrow 3Cl_2 + 3 Na_2SO_4 + 3H_2O.$ This technique for chlorine dioxide production is used on a commercial scale, with the reactants continuously being fed into a reaction vessel and the chlorine and chlorine dioxide produced continuously being removed from the reaction vessel.

Another means for the generation of chlorine dioxide is by the reaction of a chlorate with hydrochloric acid. The reactions which occur are exemplified below, wherein, for the sake of illustration the chlorate used is sodium chlorate.

(1a) $2 NaClO_3 + 4 HCl \rightarrow 2 ClO_2 + 2 NaCl + 2 H_2O$ (2a) $NaClO_3 + 6 HCl \rightarrow 3 Cl_2 + NaCl + 3 H_2O.$ Typically, in such processes, the chlorine, chlorine dioxide and water produced are removed in the vapor state and the alkali metal salt is removed from the reaction solution by crystallization.

Various processes and systems have been employed for the generation of chlorine dioxide, chlorine, and an alkali metal salt based in general on the reactions shown in the above equations. Such systems include for example, systems comprising a multiplicity of generators operating in cascade flow (U.S. Pat. No. 3,446,584, to W. A. Fuller) or a combination of a poly-zoned apparatus or plural apparatuses in which various distinct chemical and/or physical operations have been separated into chlorine dioxide generation, water evaporation, by-product salt crystallization, and reactant introduction into the system (U.S. Pat. No. 3,516,790, June 23, 1970, U.S. Pat. No. 3,341,288, Partridge, Sept. 12, 1967).

More recently, it has been proposed to provide for the generation of chlorine dioxide, chlorine, and an alkali metal salt in a single reaction vessel. Thus, for example, in U.S. Pat. No. 3,816,077, Fuller et al., June 11, 1974, there is disclosed a system wherein the generation of chlorine dioxide and chlorine, the evaporation of water, and crystallization of an alkali metal salt, are effected in a single reaction vessel. Although substantial improvement in efficiency is achieved in the combining of these processes into a single reaction vessel, the system requires external conduits, pump, and heating apparatus for the mixing, heating, circulating and recycling of the reaction mixture. It will be appreciated by those skilled in the art that still further improvements are desirable to provide a system wherein a single process vessel is employed for the mixing and temperature control of reactants, the generation of chlorine dioxide, evaporation of water, and the crystallization of alkali metal salt, as well as the continuous and efficient circulation and re-circulation of reaction mixture.

SUMMARY OF THE INVENTION

This invention provides a process for the production of chlorine dioxide, chlorine, and an alkali metal salt which comprises:

(A) separately feeding an alkali metal chlorate solution and a strong acid solution selected from the group sulfuric acid, hydrochloric acid, phosphoric acid and mixtures thereof into an integral forced circulation crystallizing reaction evaporator comprising, in vertical disposition: (a) an upper reaction crystallizing evaporation chamber having a substantially vertically disposed cylindrical partition which divides at least the lower portion of the reaction crystallizing evaporation chamber into a first and second substantially concentric cylindrical sections; (b) a heat exchange chamber comprising a multiplicity of vertically disposed tubular elements for transmission of fluids through said heat exchange chamber; and (c) a lower pump chamber, having an intake section and a discharge section and having a pump means disposed therein to provide forced circulation of liquid between the intake and discharge sections;

(b) mixing the solutions therein and circulating the resultant reaction mixture, in response to the pump means, in sequence, from the discharge section of the lower pump chamber, upwardly through a first portion of the tubular elements, through the first cylindrical section of the upper reaction crystallizing evaporation chamber, over the cylindrical partition; downwardly through a second portion of tubular elements into the intake section and discharge section of the lower pump chamber;

(C) maintaining the reaction mixture in sufficient volume to at least partially fill the evaporation chamber and provide a vapor-liquid separation space in the upper region thereof;

(D) withdrawing an aqueous slurry of alkali metal salt of said acid from the circulating reaction mixture;

(E) withdrawing chlorine dioxide, chlorine, and water vapor from the vapor liquid separation space of the upper reaction crystallizing evaporation chamber.

The reaction of the alkali metal chlorate with the strong acid is preferably achieved by feeding the reactants in separate streams into the reaction vessel from which the gaseous mixture of chlorine dioxide, chlorine and water vapors are continuously removed by coordinating the reaction solution temperature with the pressure in the vessel so that water is evaporated from the reaction solution in an amount sufficient to maintain a substantially constant volume of reaction solution. The removal of water from the reaction solution is in an amount substantially equal to the amount of water introduced to the reaction evaporator plus the water produced in the reaction. The removal of water vapor serves several functions. Among these are dilution of the chlorine dioxide gas to prevent development of explosive concentrations of gas; sweeping of the gases from the vapor space above the reaction solution to assist in gas disengagement from the liquid medium; the provision of a readily condensable diluent for the chlorine gas produced in the reaction, thereby avoiding the less desirable use of gaseous diluents with their attendant separation problems; and maintaining saturation of the alkali metal salt.

The process that is involved in the generation of chlorine dioxide, chlorine, formation of an alkali metal salt and evaporation of water in the reaction solution, all occur within the same circulating solution, the necessary reactants being continuously introduced into the reaction solution and the gaseous products of reaction being continuously withdrawn in admixture with water vapor until the solid alkali metal salt simultaneously and continuously crystallizes from the reaction solution.

The rate of chlorine dioxide generation in the process of this invention increases with the concentration of alkali metal chlorate present in the reaction solution. Therefore, the concentration of alkali metal chlorate is preferably maintained within the concentration range of about 0.2 to about 5 molar. This is especially true during operation in the range of 60° to 110° C and at pressures in the range of up to about 400 millimeters of mercury absolute, which conditions favor the solubility of large amounts of alkali metal chlorate. As the temperature is reduced in coordination with the development of a vacuum over the reaction solution to withdraw water vapor, the concentration of chlorate is necessarily reduced to prevent the crystallization of chlorate from solution which would negate any advantage derived from an increased reaction rate. Thus, when operating at a preferred pressure of about 100 to about 300 millimeters of mercury absolute and at temperature between about 65° to 110° C, the concentration of alkali metal chlorate should be about 0.2 to about 3 molar.

The acidity of the reaction solution can be maintained anywhere between about 0.5 N to about 12 N, the strong acid used affecting the efficiency at the proposed amount in ranges. For example, if an HCl system is utilized the preferred normality is in the range of about 0.5 N to about 3.5 N, wherein the alkali metal salt produced will be an alkali metal chloride. When $H_2SO_4$ is the preferred acid used or mixtures of $H_2SO_4$ and HCl are used, a preferred normality is about 1.5 N up to about 12 N. In operating $H_2SO_4$ system in ranges from about 1.5 to about 6 N the product will be an alkali metal sulfate salt and as the normality increases beyond about 6 N the alkali metal salt precipitated will be an alkali metal acid sulfate salt. Furthermore, as is known in the art, there may be employed in the process of this invention, a reducing agent such as methanol, oxalic acid, sulfur dioxide and the like, which react with chlorine to enhance the production of chlorine dioxide.

Through the use of at least one catalyst selected from the group consisting of vanadium pentoxide, silver ions, manganese ions, dichromate ions, and arsenic ions, in conjunction with the strong acids to convert an alkali metal chlorate to chlorine dioxide, applicants have found that the chlorine dioxide efficiency and the reaction rate increases at reaction solution average acidities from about 2 N to about 5 N. The silver ion is a preferred catalyst. From about 0.001 to about 1.5 grams of silver ion per liter of reaction solution should be used. Although more than about 1.5 grams of silver ion may be used, one does not obtain significant increased efficiency with the excess amount of said ion.

Manganese ion is also one of the preferred catalysts. From about 0.001 to about 4 grams of manganese ion per liter of reaction solution should be used; again, although one may use more than 4 grams of manganese ion per liter of reaction solution one does not obtain a significantly increased efficiency in chlorine dioxide generation due to the use of an excess amount of said ion.

The dichromate ion, especially in the form of an alkali metal dichromate such as sodium potassium dichromate is another preferred catalyst. It should be used at concentrations from about 0.5 to about 25 grams per liter, it again being understood that one could use more than 25 grams per liter if so desired.

The arsenic ion and vanadium pentoxide may also be used as catalysts. They should be in a concentration of about 0.05 to about 25 grams per liter.

As the reaction proceeds in said vessel, crystals of alkali metal salt appear withdrawn as a slurry. The solids may be removed from the slurry by such well known means of centrifuging, filtering, or other salt and liquid separation techniques.

When hydrochloric acid is employed as the strong acid, the process slurry may be introduced to the top of a separation column as disclosed as Ser. No. 712,283, filed Aug. 6, 1976, to obtain substantially pure alkali metal chloride salt crystals on the bottom of the column while continuously returning chloride, chlorate and acid values to the reaction evaporator.

Where the generator is utilizing sulfuric acid and mixtures thereof with hydrochloric, as the strong acid, the process slurry may be introduced at the top of a separating or metathesis column as described in U.S. Pat. No. 3,976,758; U.S. Pat. No. 3,975,505; U.S. Pat. No. 3,974,266; Ser. No. 689,405 filed May 29, 1976; Ser. No. 689,406, filed May 24, 1976; and Ser. No. 689,407, filed May 24, 1976, to obtain separation purification of resultant salts or to produce other desirable products by metathesis with or without the return of usable values to the reaction evaporator.

The mother liquor from the crystals can be used again as wash water, discarded, or saturated with sodium chloride and passed to an electrolytic cell for the production of additional alkali metal chlorate.

The partial pressures and the resulting temperatures prevailing in the reaction chamber may be varied by the admission of a stream of dry inert gas, such as nitrogen or air. This, in turn, makes possible the variation of the amount of water removed from the reaction solution as vapor. This latter method, however, has the disadvantage of causing the chlorine dioxide to be heavily diluted with inert gas. Therefore, it is preferred to so coordinate the vacuum and reaction solution temperature that the amount of water vapor necessarily removed from the vessel is flashed off without the necessity for the introduction of additional agents to remove water vapor.

For a more complete understanding of the invention, reference is made to the accompany drawing wherein:

FIG. I represents a vertical section of a preferred embodiment an integral forced circulation crystallizing reaction evaporator employed in the process of this invention.

The apparatus employed in the process of this invention is constructed so that a reaction crystallizing evaporation chamber, a heat exchange chamber, and a pump chamber are formed as an integral vertical unit into which the reactants may be continuously fed and the reaction mixture continuously circulated.

The process of the present invention is best described with specific reference to the drawing of FIG. I wherein the integral forced circulation crystallizing reaction evaporator employed comprises three chambers: an upper reaction crystallizing evaporation chamber 11, a heat exchange chamber 12, and a lower pump chamber 13.

Within the reaction crystallizing evaporation chamber 11, a substantially vertically disposed cylindrical partition 20, serves to divide at least the lower portion of the chamber into an outer section 21 and an inner section 22, the two sections being substantially concentric cylindrical sections. This inner cylinder has at its upper end a means of distributing the reaction mixture evenly across the interface between the liquid reaction mixture and the vapor space.

The lower pump chamber 13 is provided with partition means 14 which serve to separate the chamber into a discharge section 15 and an intake section 16 which are in direct fluid communication respectively, with an inner portion 17 and outer portion 18 of the tubular elements of the heat exchange chamber 12 and in turn, respectively, with the first and second cylindrical sections of the crystallizing evaporation chamber 11. Within the lower pump chamber 13, a pump means 23 in provided to direct the flow of liquids from the intake section 16 to the discharge section 15 with the result that the reaction mixture may be efficiently continuously circulated through the heat exchange chamber 12 and into the reaction crystallizing evaporation chamber 11 where the cylindrical partition 20 and the distribution member 33 serves to direct the flow of heated reacting liquid to a level near the liquid-vapor interface where the desired evaporation of water and evolution of chlorine dioxide and chlorine into the vapor-liquid separation space 19 will take place. The upper portion of cylindrical partition 20 is preferably funnel-shaped, diverging upwardly, and distribution member 33 is preferably funnel-shaped and centrally and concentrically positioned with respect to the funnel shaped portion of partition 20. Water vapor, chlorine dioxide and chlorine are withdrawn through outlet means 26 from the vapor-liquid separation space 19. The liquid reaction mixture will flow from the vapor-liquid interface above the top of the cylindrical partition 20 and downwardly through the outer cylindrical section 21, the outer portion 18 of tubular elements in the heat exchange chamber 12 and to the intake section 16 of the pumping chamber.

The alkali metal chlorate solution is introduced preferably into the pumping chamber 13, through an inlet means 24 preferably positioned in the discharge section 15 and, in response to the pump means 23, is circulated and mixed in the manner described above. The strong acid is preferably introduced into the rising liquid, through inlet means 25, preferably positioned at a location in the lower part of the inner cylindrical section 22 of the evaporation chamber 11 so that substantial mixing and reaction occur as the reaction mixture is circulated to the top of the cylindrical partition 20. Inlet means 25 is preferably constructed of or protected by a strong acid resistant material, such as Teflon. It is preferred to introduce the strong acid through inlet means 25 into the rising liquid, in close proximity above the tubular elements of the heat exchanger, since turbulence occurring as the liquids rise out of the tubular elements into the reaction crystallizing evaporation chamber 11 increases the rapid mixing of the reactants. As the reaction occurs in the crystallizing evaporation chamber 11, with the generation of chlorine dioxide and chlorine, an alkali metal salt of the strong acid is formed and crystallizes in the evaporating liquid. The alkali metal salt crystals may be removed as an aqueous slurry through outlet means 27. The aqueous slurry may be then treated as described aforesaid, and the mother liquor may be returned to the reaction mixture.

The pump means 23 may be of the mechanical type such as a rotary pump or propeller pump. Alternatively, a gas lift utilizing a stream of air or other inert gas may be employed as the pump means, either soley or in combination with mechanical pumping means.

In a preferred embodiment an entrainment separator 28 is positioned within the vapor-liquid separation space 19 in the upper region of the reaction evaporation chamber 11 to effect the separation of any entrained liquids from the vapors to be withdrawn through outlet means 26. The entrainment separator 28 may be any of the types known in the art such as a mesh type entrainment separator.

Preferably the reaction crystallizing evaporation chamber is provided with an explosion relief valve 32 to provide an emergency release of gases in the event of a sudden increase in pressure.

Although the reactions of the present process may be carried out at atmospheric pressure, it is preferred to employ subatmospheric pressures, most preferably in the range of about 50 to about 500 mm Hg absolute. The vacuum producing means may be any conventional device such as a mechanical vacuum pump, a water eductor, steam siphon, or the like (not shown).

The heat exchange chamber 12 includes a heat exchange fluid inlet 29 and outlet 30 to permit the flow of a heat exchange fluid, such as steam, through the extra-tubular space. In addition, in the extra-tubular space, there is preferably provided a multiplicity of horizontally disposed baffles 31 adapted to direct the flow of heat exchange fluid in a horizontally alternating path to maximize the efficiency of heat exchange. The flow of heat exchange fluid is adjusted to achieve the desired reaction temperature. To adjust the reaction mixture to the desired temperature, the degree of vacuum applied to the evaporator chamber is adjusted until the reaction solution will be at its boiling point when at the desired temperature, and the rate of heat input to the heat exchange chamber is adjusted to raise the temperature of the reaction to the boiling point and to evaporate water at a rate sufficient to maintain a substantially constant volume of liquid.

The evaporation of water at the aforementioned rate causes the formation of crystalline product in the reaction solution in the reaction crystallizing evaporation chamber 11. The rate of energy input into the system from all sources after steady state conditions have been reached is such that all of the water being added to the system and being formed by the reactions taking place therein, less any water of crystallization in any of the crystalline alkali metal salts and water from the aqueous slurry withdrawn from the system, is evaporated from the reaction solution in the reaction crystallizing evaporation chamber and withdrawn as water vapor from the system. This rate of energy input is related to the temperature chosen, the corresponding vacuum, the rate at which water is being added to the system after steady state conditions have been reached and the rate at which water is being removed as water of crystallization and as aqueous slurry.

The temperature of the reaction mixture may vary considerably depending on the rate of evaporation desired and the operating pressure. It is preferred, however, that the reaction mixture be maintained at the boiling temperature of about 65° to about 100° Celsius, at the operating pressure which is preferably a pressure of about 150 to about 300 mm Hg and most preferably about 200 to about 250 mm Hg.

The integral forced circulation crystallizing reaction evaporator employed in the process of this invention is subject to both corrosive and corrasive action from the reaction mixture and thus must be constructed of materials capable of withstanding such attack. Furthermore, the materials of construction must be resistant to deterioration at operating temperatures and have sufficient strength to withstand the effect of vacuum operation. It is known that titanium is an excellent material of construction for such purposes. However, the cost of titanium is such that, for economic considerations, other materials have been used in the prior art, as a partial or complete substitute for titanium. In one such prior art process for the generation of chlorine dioxide and chlorine, a preferred material of construction is a polyester resin which is imperious to the corrosive attach of the chloride ion and is not subject to oxidation by the action of chlorine dioxide nor subject to attach by the chlorine through addition or substitution, and is not subject to corrosive attach by the mineral acid employed in the reaction solution. A typical polyester resin that meets these requirements is the polyester resin disclosed in U.S. Pat. No. 3,816,077, comprising about 0.5 mole fraction of chlorendic acid and maleic anhydride and about 0.5 mole fraction neopentyl glycol, and about 45 parts of styrene per 100 parts of resin. The resin itself may be prepared in accordance with the procedures disclosed in U.S. Pat. No. 2,634,251, the subject matter of this patent being expressly incorporated herein by reference for the purpose of illustrating the techniques for the formulation of the resin from the components set forth.

Polyester resins of the type described satisfy the requirements of temperature resistance, mechanical strength, and corrosion resistance. However, such materials are subject to deterioration from corrasion where contact with the alkali metal salt crystals occurs. With the above considerations in mind, it is preferred to construct the integral forced circulation crystallizing reaction evaporator of a combination of materials whereby that portion of the evaporator in contact with the liquid reaction mixture is constructed of titanium and that portion of the evaporator in contact with the vapors above the liquid constructed of a suitable polyester resin.

In a typical operation, the process of the invention is effected utilizing a flow scheme as illustrated in the drawing to produce a gaseous mixture of chlorine dioxide and chlorine and a sodium sulfate salt. An aqueous solution of 3.2 M sodium chlorate and 3.36 M sodium chloride is fed into the discharge side of the pump chamber (13) through inlet 24 and circulated upwardly through the inner portion (17) of the tubular elements of the heat exchange chamber (12). As the solution enters the inner portion (22) of the evaporation chamber (11), an aqueous solution of 50% sulfuric acid is added through inlet means (25) and mixes with the rising solution. The pressure of the system is adjusted to about 200 millimeters of mercury absolute. Steam is passed through the heat exchange chamber (12) by means of inlet (29) and outlet (30) at a rate and temperature sufficient to maintain the circulating reaction mixture at a temperature of about 78° Celsius. The rate of input of reactants is adjusted such that the volume of reaction mixture is maintained at a constant level, above the top of the cylindrical partition (20) and distribution member 33 as the excess water added with the feed solutions is boiled out, exiting as a vapor from the evaporation chamber (11) through outlet (26), together with the chlorine dioxide and chlorine generated by the reaction mixture. In response to the pump (23) the reaction mixture circulates throughout the chambers of the reaction evaporator in the manner indicated in the accompanying drawing. As the reaction proceeds, the chlorine dioxide and chlorine are generated and withdrawn together with water vapor. Anhydrous sodium sulfate is crystallized from the solution and withdrawn from the reaction mixture through outlet (27) of the pump chamber (13).

It will be appreciated that, although various specific embodiments of the process of this invention have been described hereinabove, various modifications and combinations of these specific embodiments may be employed without departing from the spirit and scope of the invention. Thus, for example, although the preferred method of circulating the reaction mixture, to achieve maximum efficiency of mixing and flow across the liquid vapor interface, is in the direction shown by the arrows in FIG. 1, the direction of flow may be reversed. Furthermore, although the reaction crystallizing evaporation chamber 11 has been described, in the preferred embodiment as comprising two substantially concentric cylindrical sections 21 and 22, these sections may vary from cylindrical shape without substantial adverse effect on the desired flow of reaction mixture. Furthermore although the heat exchange chamber 12 has been illustrated as being formed of a multiplicity of tubular elements 17 and 18, the exact number and diameter of the tubular elements may be varied, depending on the anticipated flow-rate and the amounts of reaction mixture to be circulated.

What is claimed is:

1. A process for the production of chlorine dioxide, chlorine, and an alkali metal salt which comprises:
   (A) separately feeding an alkali metal chlorate solution and a strong acid solution selected from the group consisting of sulfuric acid, hydrochloric acid, phosphoric acid and mixtures thereof into an integral forced circulation crystallizing reaction evaporator comprising, in vertical disposition: (a) an upper reaction crystallizing evaporation chamber having a substantially vertically disposed cylindrical partition which divides at least the lower portion of the reaction crystallizing evaporation chamber into a first and second substantially concentric cylindrical sections; (b) a heat exchange chamber comprising a multiplicity of vertically disposed tubular elements for transmission of fluids through said heat exchange chamber; and (c) a lower pump chamber, having an intake section and a discharge section and having a pump means disposed therein to provide forced circulation of liquid between the intake and discharge sections;
   (B) mixing the solutions therein and circulating the resultant reaction mixture, in response to the pump means, in sequence, from the discharge section of the lower pump chamber, upwardly through a first portion of the tubular elements, through the first cylindrical section of the upper reaction crystallizing evaporation chamber, over the cylindrical partition; downwardly through a second portion of tubular elements into the intake section and discharge section of the lower pump chamber;

(C) maintaining the reaction mixture in sufficient volume to at least partially fill the evaporation chamber and provide a vapor-liquid separation space in the upper region thereof;

(D) withdrawing an aqueous slurry of alkali metal salt of said acid from the circulating reaction mixture;

(E) withdrawing chlorine dioxide, chlorine, and water vapor from the vapor liquid separation space of the upper reaction crystallizing evaporation chamber.

2. A process according to claim 1 wherein said cylindrical partition is funnel-shaped in the upper portion thereof and a funnel-shaped distribution member is centrally positioned therein.

3. A process according to claim 2 wherein the reaction mixture is circulated in sequence, upwardly through an inner discharge section of the pump chamber, an inner first portion of tubular elements of the heat exchange chamber, through a central first cylindrical section of the reaction crystallizing evaporation chamber within the cylindrical partition and downwardly through an outer second section of the reaction crystallizing evaporation chamber, an outer second portion of tubular elements of the heat exchange chamber and through an outer intake section of the pump chamber.

4. A process according to claim 3 wherein said alkali metal chlorate solution is introduced into the discharge section of the pump chamber.

5. A process according to claim 4 wherein said strong acid solution is introduced into the upwardly circulating reaction mixture in the lower portion of the first cylindrical section of the upper reaction crystallizing evaporation chamber.

6. A process according to claim 5 wherein said reaction mixture is maintained at a temperature of about 65° to about 100° Celsius and a pressure of about 100 to about 300 millimeters of mercury absolute.

7. A process according to claim 6 wherein said alkali metal chlorate solution is an aqueous solution of sodium chlorate and said strong acid solution is hydrochloric acid.

8. A process according to claim 6 wherein said alkali metal chlorate solution is an aqueous solution of sodium chlorate and said strong acid solution is sulfuric acid.

9. A process according to claim 6 wherein an entrainment separator for the separation of liquid particles from vapors is positioned within said vapor-liquid separation space.

10. A process according to claim 7 wherein a catalyst selected from the group consisting of vanadium pentoxide, silver ions, manganese ions, dichromate ions, and arsenic ions is incorporated in the reaction mixture.

* * * * *